3,344,161
POLYMERIC SILTHIAN COMPOUNDS
Kurt Moedritzer, Webster Groves, and John R. Van Wazer, Ladue, Mo., assignors to Monsanto Company, St. Louis, Mo., a corporation of Delaware
No Drawing. Filed May 25, 1964, Ser. No. 370,074
10 Claims. (Cl. 260—448.8)

The present invention relates to novel polymeric silicon and sulfur containing compounds of the silthian type particularly to linear chain molecular configurations thereof.

According to the invention, there are provided new and valuable silthian compounds having the general formula:

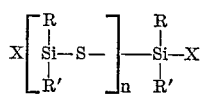

in which R and R' are alike or different, and are selected from the group consisting of hydrocarbyl radicals, having from 1 to 20 carbon atoms, such as saturated and unsaturated alkyl radicals having from 1 to 20 carbon atoms, and phenyl and substituted phenyl radicals having from 6 to 20 carbon atoms; X is a halogen such as fluorine, chlorine, bromine and iodine as well as alkoxyl, thioalkyl, dialkylamino and cyano, and $n$ has a value of 1 to 100. For example, when $n=1$, and $R=R'=CH_3$ the chlorine-substituted product is a linear dimer for example

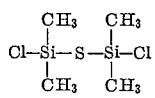

having a molecular weight of 219, or when $n=2$, and $R=R'=CH_3$ the product is a trimer

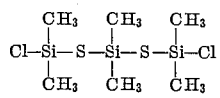

having a molecular weight of 309.

Silthian compounds have been heretofore limited to ring types of molecular configurations, for example

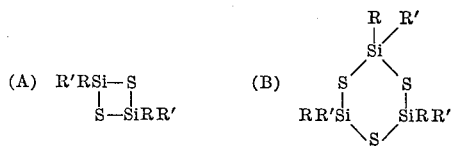

where R and R' have the meaning set forth above. However the ring compounds have not yielded polymeric materials.

The general method of preparation of the novel chain type polymeric silthians utilizes a di-substituted dihydrocarbyl silane and a trimeric cyclodihydrocarbyl silthian. The silane material such as a di-substituted dialkyl silane is employed in the proportion of 3:1 to 3:50 relative to the trimeric cyclodihydrocarbyl silthian, with the larger proportions favoring the production of higher polymeric products. These two components are heated to a temperature of from 50° C. to 300° C. The chain type polymeric silthian which result exist as dimeric, trimeric, tetrameric, pentameric, hexameric, heptameric, octameric, nonameric, decameric and higher forms. As an example, hexaethyltrisilthian is reacted at 200° C. with dichlorodiethyl silane to obtain linear polymers of alpha,omega-dichloropolydiethyl silthian. As another specific example of a desirable material, alpha,omegadichloropolydiphenyl silthian is obtained by heating and mixing together dichloro diphenyl silane with trimeric cyclo diphenyl silthian at a temperature of about 200° C.

The linear polymeric products are separated from the reaction mixture. However, the products are generally obtained as mixtures of polymers which may be used in the form of mixtures for certain industrial applications.

The silthian starting material such as trimeric cyclodiphenyl silthian is prepared by reacting diphenyl dichlorosilane with hydrogen sulfide in an inert solvent.

The reaction is preferably conducted in a closed vessel, although the use of relatively high boiling starting materials, e.g., a boiling point of at least 200° C. for the silane starting material, permits the use of an open vessel.

While the silane and silthian components described above react without a catalyst, it has been found that Lewis acid type catalysts provide a faster reaction to obtain the present products. For example, aluminum chloride, boron trifluoride, zinc dichloride, ferric tribromide and antimony pentachloride are representative catalysts which are useful in the present process.

The aforesaid reactants are preferably sealed into a reaction vessel using an inert atmosphere such as nitrogen gas. The reaction tubes are then maintained at a temperature in the range of from 50° C. to 300° C. for a period of time of from 1 hour to 200 hours, with the higher temperatures providing a shorter reaction time. If desired a solvent such as benzene, ether, or hydrocarbons may be employed, although a solvent is not essential. The polymeric products of the present invention have good stability.

The following examples illustrate specific embodiments of the present invention.

EXAMPLE 1

The preparation of the methyl substituted polymeric silthian is shown in the present example. A pressure tube is charged with 1 mole of dimethyl dichlorosilane together with ⅓ of a mole of hexamethyl trisilthian. The tube containing this mixture is sealed under nitrogen, and is then heated in a tube furnace. The progress of the reaction is followed by withdrawing the tube from the furnace from time to time and measuring the presence of the desired polymeric reaction products by proton nuclear magnetic resonance. The table shows the relationship of dimeric and higher polymeric products.

Amount of polymers in the product of the reaction of dimethyldichlorosilane and trimer dimethylsilthian

| Ratio (CH₃)₂SiCl₂ versus [(CH₃)₂SiS] | Percent Dimer | Percent Trimer and higher polymers |
|---|---|---|
| 1:2.33 | 55 | 45 |
| 1:1 | 65 | 35 |
| 1:0.55 | 70 | 30 |
| 1:0.33 | 73 | 27 |
| 1.67:0.33 | 83 | 17 |
| 3:0.33 | 60 | 40 |
| 7:0.33 | 40 | 60 |

In order to separate the desired chain compounds up to the decameric form and higher from the reaction mixture, various separation procedures such as chromatographic absorption and distillation are employed. Distillation is preferably carried out under vacuum conditions. For example, the dimeric compound

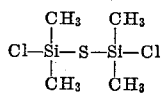

has a boiling point of approximately 100° C. at 15 mm. pressure. The trimeric compound

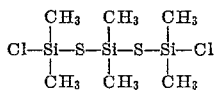

shown above has an approximate boiling point of 140° C. at 2 mm. pressure. Separation of the dimer and trimer is readily carried out by distillation.

Identifications of the molecular characterization of the chain compositions of the present invention are conducted by the following procedure. The dimer is identified by the proton nuclear magnetic resonance spectrum with a single peak at —0.767 p.p.m. The trimer gives proton nuclear magnetic resonances at —0.758 and —0.667 p.p.m. in the calculated ratio of 2:1 for methyl groups on silicon in terminal groups versus middle groups.

The trimeric cyclodimethylsilthian show a single sharp proton nuclear magnetic resonance peak at —0.67 p.p.m., and the dimeric ring molecule at —0.72 p.p.m. The resonance for the dimethyldichlorosilane is seen at —0.78 p.p.m. The reaction product of the reaction of dimethyl dichlorosilane and trimeric dimethylsilthian show in addition to the three resonances seen above, peaks at —0.765, —0.76 and —0.75 p.p.m. From the fact that these three peaks form a cluster of signals lying between those of the two starting materials, and the variation of their relative intensities with the relative composition of the two reactants, particularly the maximization of these peaks at the 1:1/3 mole ratio $(CH_3)_2SiCl_2$ versus trimer dimethylsilthian, these three signals are assigned to end groups in silthian chains. This is confirmed by a mathematical treatment assuming random ligand exchange of chlorine and sulfur atoms on the dimethylsilicon moiety.

EXAMPLE 2

The use of a methoxy group as a substituent in the products and process of the present invention is shown by following the procedure of Example 1, using dimethoxy diethylsilane having the formula $(CH_3O)_2Si(C_2H_5)_2$ This reagent is used with hexaethyl trisilthian as the silicon-sulfur component in the ratio of 10 moles of hexaethyl trisilthian, and 1 mol of dimethoxy diethylsilane. The products show a greater proportion of the higher polymeric forms such as the tetramer in comparison to Example 1 above, e.g., the maximum amount of tetramer obtained as a white solid is between 20% and 40% based upon the silicon in such tetramer relative to the total silicon in the polymeric products. The reaction products also include higher polymeric forms such as the pentamer, hexamer, octamer, etc.

The various polymeric forms are soluble in benzene, carbon disulfide, hydrocarbon and chlorocarbon solvents such as carbon tetrachloride.

EXAMPLE 3

The use of phenyl groups as a substituent in the products and process of the present invention is shown by following the procedure of Example 1, using dichloro diphenyl silane having the formula $(C_6H_5)_2SiCl_2$. This reagent is used with hexaphenyl trisilthian as the silicon-sulfur ring in the ratio of 5 moles of hexaphenyl trisilthian and 1 mole of dichloro diphenylsilane. The reaction products also include higher polymeric forms such as the pentamer, hexamer, octamer, etc.

The various polymeric forms are soluble in benzene, carbon disulfide hydrocarbon and chlorocarbon solvents such as carbon tetrachloride.

EXAMPLE 4

The use of an unsaturated group as a substituent in the products and process of the present invention is shown by following the procedure of Example 1, using dimethyl mercapto divinylsilane in the presence of 1% aluminum chloride as catalyst. The reaction products also include higher polymeric forms such as the pentamer, hexamer, octamer, etc.

The various polymeric forms are soluble in benzene, carbon disulfide hydrocarbon and chlorocarbon solvents such as carbon tetrachloride, and are separated by column chromatography. In the present example the major products are the dimer, trimer and tetramer of alpha,omega-dimercapto-polydivinyl silthian.

The polymeric silthians of the present invention particularly the unsaturated alkyl types have utility as monomeric starting materials for use in the production of silicon containing polymers, and are particularly desirable for use in copolymerization with unsaturated hydrocarbon monomers such as vinyl chloride, vinyl acetate, styrene, acrylonitrile, butadiene, etc. Silicone monomers may also be copolymerized with the present silthian. Other silicon containing compounds such as $RSiX_3$, for example $CH_3SiCl_3$, $C_6H_5Si(OCH_3)_3$, $C_2H_5Si[N(CH_3)_2]_3$ and $CH_2CH_2Si(SC_2H_5)_3$ may also be used in copolymers of the present linear polymeric silazanes to give higher molecular weight copolymers. Other applications for these compounds are as water proofing agents, particularly the methyl substituted polymeric silthians. The present polymeric silthians are also reactive with cellulose. Consequently, modified forms of cellulose, such as rayon e.g., a water resistant film based upon regenerated cellulose is obtainable by treatment with the present materials.

The silthian compounds of the present invention, particularly the phenyl substituted compositions are also of utility as insecticides. These compounds upon exposure to atmospheric conditions slowly release hydrogen sulfide gas, aiding in the insecticidal activity. For example the hexamethyl silthian when used as a synergistic additive in a standard synergistic test using a mixture of three components which themselves show no activity.

N-methyl-alpha-naphthyl carbamate and O,O-dimethyl-S-(1,2-dicarbethoxy ethyl) dithiophosphate, and 1,1,-bis-para chlorophenyl - 2,2 - dichlorethane exhibits pronounced activity against mosquito larvae.

The polymeric silthians of the present invention, particularly the trimeric and higher polymeric forms are also useful as functional fluids. In this relationship the pronounced thermal stability of such compositions provides for long life of the functional fluids. The ability of the above described silthians to slowly release hydrogen sulfide in an aqueous solution also gives a convenient solid starting material to provide controlled proportions of hydrogen sulfide in various preparation reactions.

What is claimed is:

1. Chain silthians having the general formula

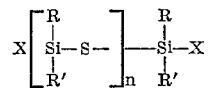

in which R and R′ are alike and different radicals selected from the group consisting of hydrocarbyl radicals having from 1 to 20 carbon atoms, X is selected from the group consisting of fluorine, chlorine, bromine, iodine, alkoxyl, thioalkyl, dialkylamino and cyano; and $n$ has a value of 1 to 100.

2. The polymeric composition

Cl—[Si(CH$_3$)$_2$—S—]$_n$—Si(CH$_3$)$_2$—Cl where $n$ is a whole number from 1 to 100.

3. The polymeric composition

Cl—[Si(C$_6$H$_5$)$_2$—S—]$_n$—Si(C$_6$H$_5$)$_2$—Cl where $n$ is a whole number from 1 to 100.

4. The polymeric composition $$CH_3O-[Si(C_2H_5)_2-SCH_3]_n-Si(C_2H_5)_2-OCH_3$$

where $n$ is a whole number from 1 to 100.

5. The polymeric composition $$CH_3S-[Si(CH=CH_2)_2-S-]_n-Si(CH=CH_3)_2-SCH_3$$

where $n$ is a whole number from 1 to 100.

6. The process for preparing a linear polymeric silthian having the formula $$X\left[\begin{array}{c}R\\|\\Si-S-\\|\\R'\end{array}\right]_n\begin{array}{c}R\\|\\Si-X\\|\\R'\end{array}$$

in which R and R' are alike and different, and are selected from the group consisting of hydrocarbyl radicals having from 1 to 20 carbon atoms; X is selected from the group consisting of fluorine, chlorine, bromine, iodine, alkoxyl, thioalkyl, dialkylamino and cyano; and $n$ has a value of 1 to 100, which comprises mixing and heating $RR'SiX_2$ together with a cyclic silthian trimer $[RR'SiS]_3$.

7. The process for preparing a linear polymeric silthian having the formula $$Cl[Si(CH_3)_2-S-]_n-Si(CH_3)_2-Cl$$

where $n$ is 1 to 100, which comprises mixing and heating together $(CH_3)_2SiCl_2$ together with the cyclic silthian trimer $[(CH_3)_2SiS]_3$ and thereafter separating the linear chain products from the reaction mixture.

8. The process for preparing a linear polymeric silthian having the formula $$Cl-[Si(C_6H_5)_2-S-]_n-Si(C_6H_5)_2-Cl$$

where $n$ is 1 to 100, which comprises mixing and heating together $(C_6H_5)_2SiCl_2$ together with the cyclic trimer $[(C_6H_5)_2SiS]_3$ and thereafter separating the linear chain products from the reaction mixture.

9. The process for preparing a linear polymeric silthian having the formula $$CH_3O-[Si(C_2H_5)_2-S-]_n-Si(C_2H_5)_2-OCH_3$$

where $n$ is 1 to 100, which comprises mixing and heating together $(C_2H_5)_2Si(OCH_3)_2$ together with the cyclic trimer $[(C_2H_5)_2SiS]_3$ and thereafter separating the linear chain products from the reaction mixture.

10. The process for preparing a linear polymeric silthian having the formula $$CH_3-S[Si(CH=CH_2)_2-S-]_n-Si(CH=CH_2)_2-SCH_3$$

where $n$ is 1 to 100, which comprises mixing and heating together $(CH=CH_2)_2Si(SCH_3)_2$ together with the cyclic silthian trimer $[(CH_3=CH)_2SiS]_3$ and thereafter separating the linear chain products from the reaction mixture.

References Cited
UNITED STATES PATENTS

| | | | |
|---|---|---|---|
| 2,567,724 | 9/1951 | Moody | 260—448.2 |
| 2,756,220 | 7/1956 | Brooks et al. | 260—448.2 |

OTHER REFERENCES

Eaborn: Journal of the Chemical Society, 1950, p. 3077.

Emeleus et al.: Journal of the Chemical Society, 1958, p. 609.

TOBIAS E. LEVOW, *Primary Examiner.*

P. F. SHAVER, *Assistant Examiner.*